Dec. 29, 1970  H. F. KLIEWER ET AL  3,550,333
PORTABLE HANGER

Filed Sept. 18, 1968  3 Sheets-Sheet 1

HOMER F. KLIEWER, DECEASED
BY BETTY J. KLIEWER, ADMINISTRATRIX
JOHN E. RAWSON
CO-INVENTORS

Huebner & Worrel
ATTORNEYS

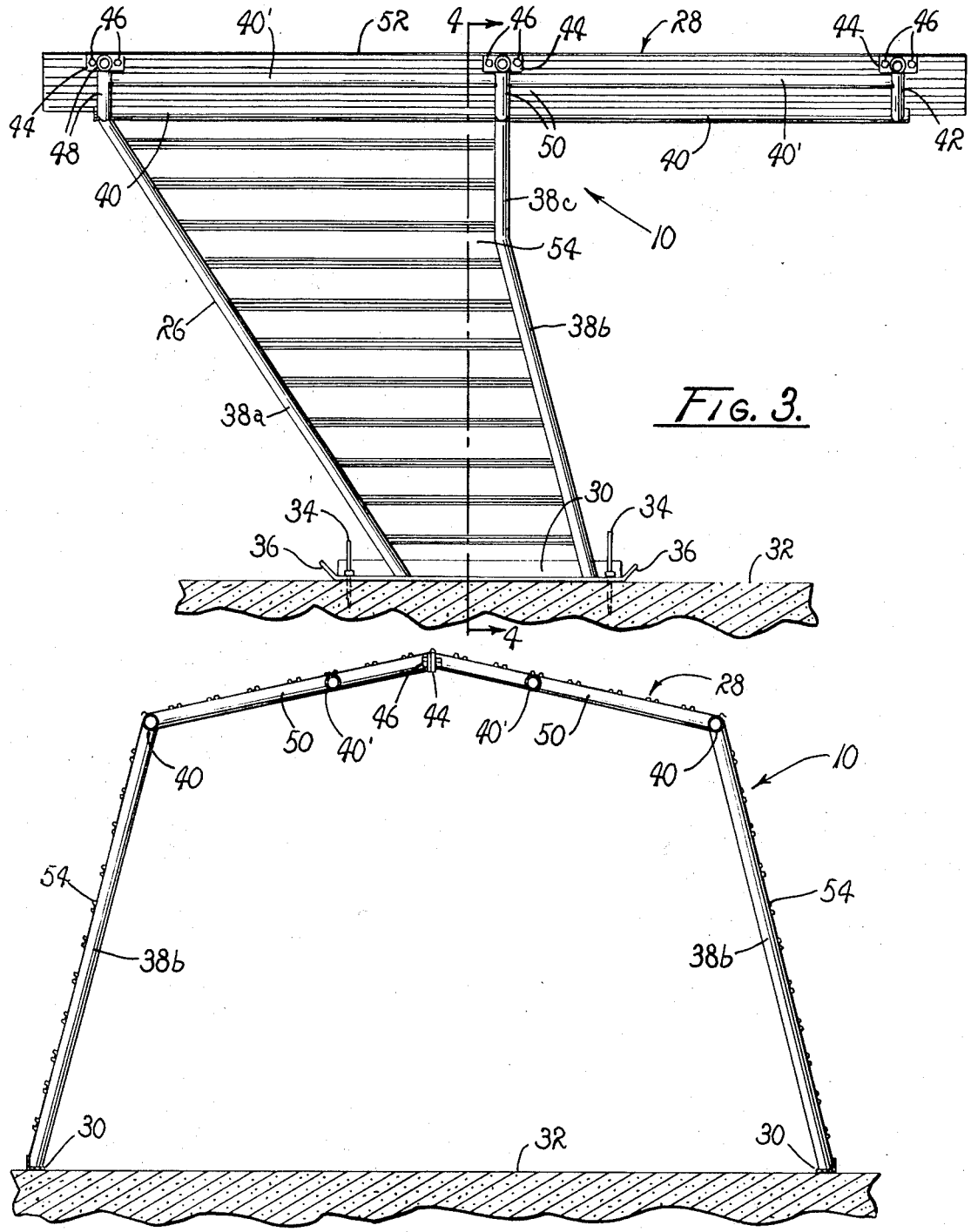

United States Patent Office 3,550,333
Patented Dec. 29, 1970

3,550,333
PORTABLE HANGAR
Homer F. Kliewer, deceased, late of Orosi, Calif., by Betty J. Kliewer, administratrix, Orosi, and John E. Rawson, Dinuba, Calif., assignors of one-third to Elmer H. Schuil, Dinuba, Calif.
Filed Sept. 18, 1968, Ser. No. 760,738
Int. Cl. E04b 1/34, 1/343, 6/44
U.S. Cl. 52—73                                 5 Claims

ABSTRACT OF THE DISCLOSURE

A portable hangar constituting a protective housing for individual aircraft having an elongated fuselage with a pilot's compartment and wings extending transversely thereof. The housing includes a statically stable, inverted U-shaped frame structure and skin having sides adapted to receive therebetween that portion of the fuselage which is forwardly of the wings, and a roof interconnecting the upper ends of the sides and extending rearwardly thereof in overhanging relation to the pilot's compartment.

BACKGROUND OF THE INVENTION

The present invention relates to a portable hangar for aircraft and more particularly to a protective housing for individual aircraft which effectively shields the propeller, engine, pilot's compartment and the instruments therein and is of a stable construction with a pleasing appearance and readily portable.

Heretofore, to protect aircraft against the effects of the weather it has been customary to store the aircraft in a large hangar or out in the open with a makeshift cover, such as a tarpaulin or the like, over the most important parts of the aircraft. Storage in a large hangar, while very effective in its protective aspects, has the disadvantage of crowding the aircraft in order to make effective use of the space. This presents the problem of getting the aircraft in and out of the hangar rapidly and in a safe manner. Additionally, such type of protective housing is relatively expensive in comparison to the number of aircraft that can be stored effectively therein yet make the aircraft readily available for flight when desired. To a major extent, the same disadvantages are encountered in T-hangars in which individual aircraft are housed. Consequently, aircraft are often stored outdoors in proximity to an airstrip. This is particularly true in areas with little rain and where the weather is generally sunny and clear. Such weather, although in many respects ideal for flying, causes the parts of the plane to become quite hot, especially the space inside the pilot's compartment. As a result, not only is occupancy of the compartment made uncomfortable, but of even more importance, the great heat has a detrimental effect upon the materials and the instruments therein.

SUMMARY OF INVENTION

It is therefore an object of the present invention to provide a hangar for individual aircraft which effectively shields the most vital portions of the aircraft from weather damage.

Another object of the invention is to provide a hangar for individual aircraft which is readily portable and statically stable.

Another object is to provide a hangar for individual aircraft which is well ventilated and of a pleasing appearance.

Another object is to provide an aircraft hangar having a frame structure readily adaptable for use with high-wing and low-wing aircraft.

Another object is to provide an aircraft hangar of economical construction which is easy to manufacture and is adapted to mass production.

Another object is to provide an aircraft hangar constructed of parts that can be shipped partially assembled in nesting relation for a saving in shipping costs and assembly can be readily completed in a facile and rapid manner using common tools.

Other objects and advantages will become apparent in the subsequent description in the specification.

BRIEF DESCRIPTION OF DRAWINGS

FIG. 3 is an enlarged longitudinal vertical section of the hangar taken on line 3—3 in FIG. 2.

FIG. 4 is a transverse vertical section of the hangar taken at a position represented by 4—4 in FIG. 3.

DESCRIPTION OF THE FIRST EMBODIMENT

Figure 1:
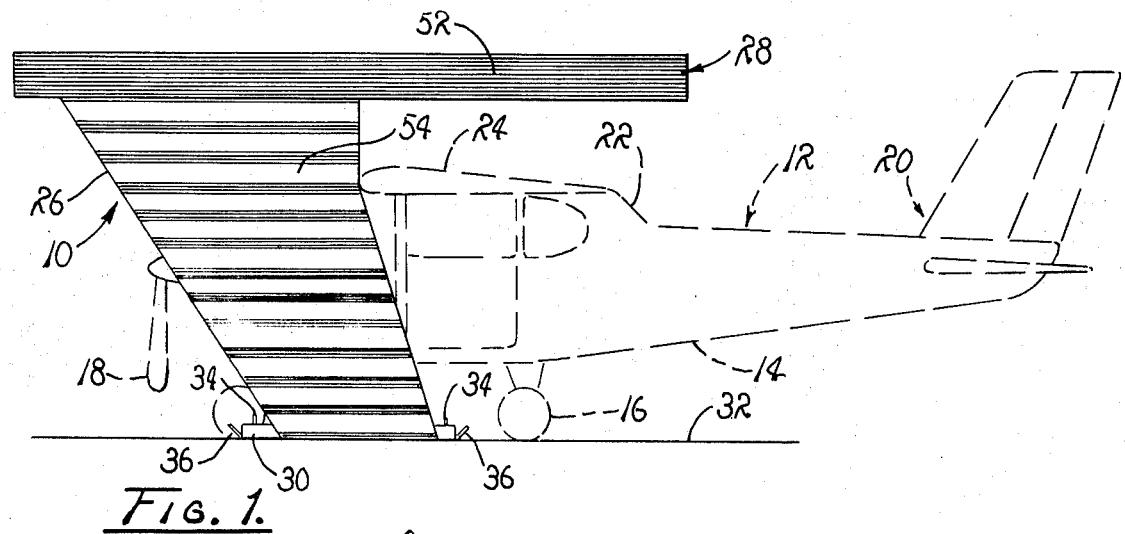
Fig. 1 is a side elevation of a hangar embodying the principles of the present invention which illustrates its relation to a high-wing aircraft shown in dashed lines.
Figure 2:
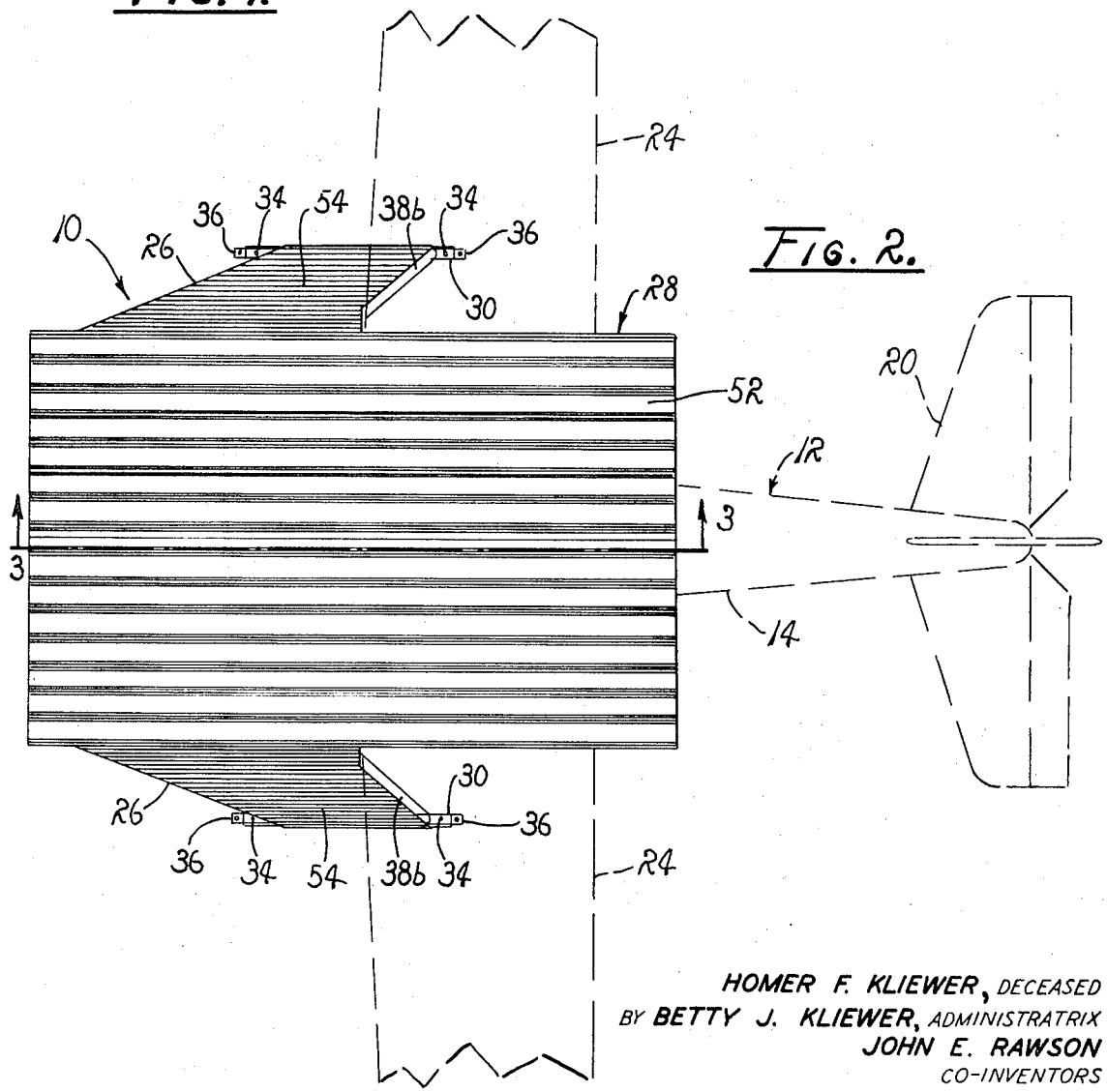
FIG. 2 is a plan view of FIG. 1 with the wings of the aircraft interrupted for illustrative convenience.

Referring to the drawings, there is shown in FIGS. 1 and 2 a hangar 10 embodying the principles of the present invention in shielding relation to a high-wing aircraft 12 of conventional type which includes an elongated fuselage 14 supported on landing wheels 16 and has a power-driven propeller 18 at its forward end and a control empennage 20 at its rear end. The fuselage is formed with a cabin or pilot's compartment 22 atop of which is a monoplane wing 24.

The hangar 10 is formed with forwardly slanted sides 26 and an interconnecting roof supporting portion 28, the lower edges of the sides being connected to support members or skids 30 adapted to be anchored to a supporting surface 32. The hangar 10 is adapted to receive between its sides 26 the propeller 18 and that portion of the fuselage which is forwardly of the wing 24, with the roof portion 28 in overhanging relation to the pilot's compartment 22 and the central adjacent portions of the wing 24.

Each member 30 is conveniently formed of angle iron with a horizontal leg suitably perforated to receive anchor pins 34, as best seen in FIG. 3, adapted to be driven into the surface 32 which can be packed earth, an asphalt layer or any other suitable covering for a parking area. In the case of a concrete supporting surface, the pins can be replaced with expansion bolts, not shown, threadedly engageable with nuts, also not shown, suitably secured in the concrete. Each member 30 is preferably formed with bent up opposite ends 36 make the member a skid for portability of the hangar.

Figure 5:
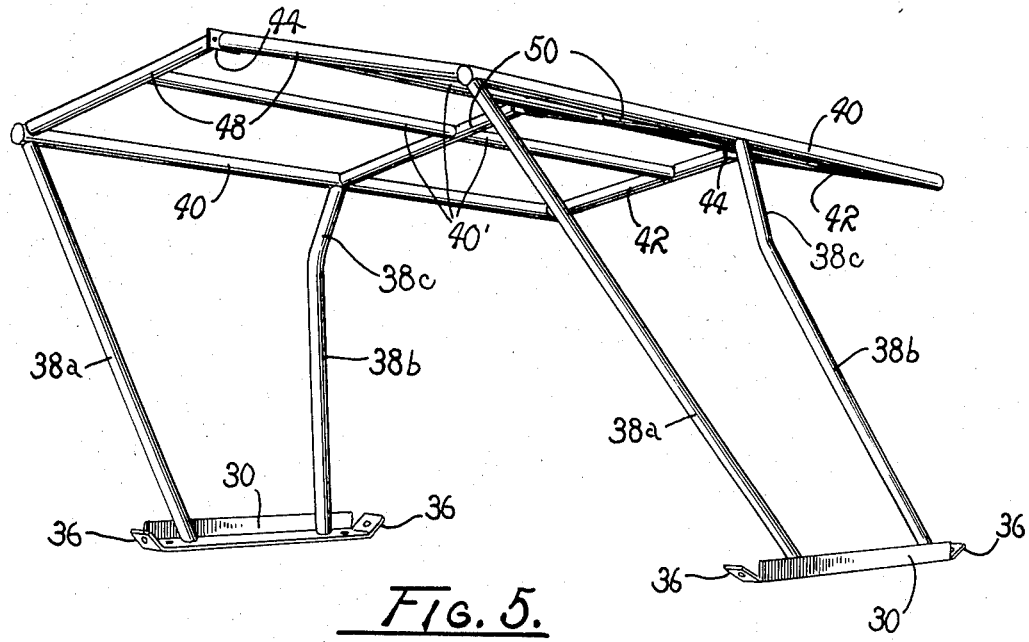
FIG. 5 is a perspective view of the framework of the structure.

Inviting attention to FIGS. 4 and 5, it will be appreciated that the hangar 10 has an arched or inverted U-shaped configuration with a framework including transversely spaced pairs of upstanding tubular members or spars 38a and 38b, secured to the skids 30. Each spar 38a is inclined with respect to its connecting skid and extends forwardly therefrom. The other spar 38b of each pair is disposed rearwardly of the associated spar 38a and is also inclined with respect to the associated skid and extends forwardly from its connection therewith. The upper portion of each spar 38b is angled with respect to the remainder theerof to provide a substantially vertical portion 38c. The vertical portion is from approximately one-third to one-fourth of the total length of the spar and preferably about two-sevenths thereof. The rearward spars are upwardly extended at an angle of approximately 55° from their respective skids and the forward spars at an angle of approximately 75°.

A pair of parallel longitudinally extending tubular members or stringers 40 are secured to the upper ends of the pairs of the spars and extend rearwardly beyond the respectively vertical portions 38c, as shown in FIGS. 3 and 5. Each of the stringers extends forwardly and rearwardly substantially the same distance from the upper end of its rearward spar 38b. Affixed to the rear end of each stringer 40 is a transverse tubular member or rib 42 extending inwardly and upwardly therefrom. The ribs 42 are of equal length and the inner ends thereof are joined along a median line lying generally in a vertical plane disposed midway between the pairs of spars, preferably by a pair of complemnetary clamp members 44 releasably bolted together, as at 46. Additional pairs of tubular members or ribs 48 and 50, similar in dimension and inclination to the ribs 42, have outer ends fixed to the stringers 40 and inner ends releasably joined by clamps 44 and bolts 46 on the aforementioned median line. The ribs 48 interconnect the forward ends of the stringers 40. The ribs 50 are fixed to the stringers 40 at the junction thereof with the portion 38c, thus midway of the stringers 40. Shorter tubular members or stringers 40' disposed generally parallel to the stringers 40 interconnect the ribs 50 with the ribs 42 and 48. The several members are suitably secured together, as by welding or the like. Quite obviously they may be of rod, angle, box or other configuration as design and strength considerations suggest.

Each set of members 38a, 38b, 40, 40', 42, 48 and 50 to one side of the median line together constitute a complementary frame-half including a roof supporting half and a side, to which coverings 52 and 54, respectively, are suitably secured. The coverings can be made of any suitable material, such as sheet plastic or sheet metal, plain, painted or anodized. The covering 52 on each roof half is applied thereto so that when complementary halves are clamped together the inner edges of the coverings overlap slightly for suitable coverage but permit ready separation of the halves. When separated, the halves readily lend themselves to nesting for storing or shipping in a limited space.

DESCRIPTION OF SECOND EMBODIMENT

Figure 6:
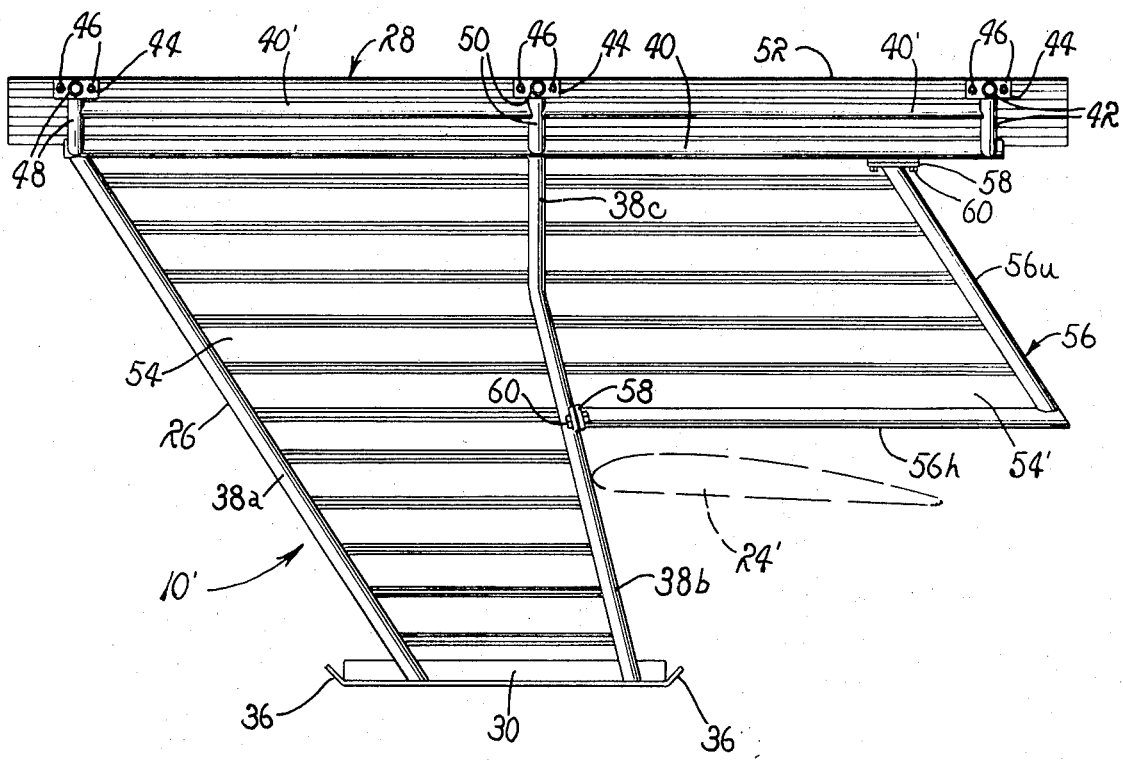
FIG. 6 is a longitudinal vertical section of a second form of the invention for use with a low-wing aircraft, a wing of which is shown in dashed lines.

Referring to FIG. 6, there is shown a complementary half of a second form of portable hangar 10' which is similar to the complementary half of the hangar 10 shown in FIG. 3 but additionally has an angular frame 56 supporting a side covering 54' which may be supplemental to the side covering 54 or an appropriate extension thereof. Each frame 56 includes a substantially horizontal tubular member 56h joined at one end to an upstanding tubular member 56u, as by welding or the like, the other end of the member 56h being suitably secured to the member 38b, as by a clamp 58 and nut and bolt connection 60, the upper end of the member 56u being similarly secured to the stringer 40 adjacent its rear end. The hangar 10' is adapted for use with low-wing aircraft having a wing 24', the dashed outline of which in FIG. 6 illustrates the relation of the aircraft to such modified form of the hangar of the present invention.

In both forms of the hangar, the parts are so dimensioned, considering the various characteristics thereof, that the center of weight of the hangar is disposed generally along a line defined by the intersection of the aforementioned vertical plane containing the median line with a vertical plane perpendicular thereto and disposed in between the members 38a and the portions 38c. This provides a structure which is statically and dynamically stable for ease in transporting a hangar to a desired support location and maintaining it in such location. Additionally, in the interest of economy of manufacture, the parts are preferably proportioned to utilize roof and side covering material in commercially available sizes for minimizing cutting thereof and scraps of unusable material. A further saving in costs in storing and shipping is provided by the complementary half construction of the hangar of the present invention in that such halves are conveniently nested, yet rapidly and easily assembled using common tools ordinarily available such as pliers and wrenches.

OPERATION

The operation of the structure of the present invention is believed to be clearly apparent and is briefly summarized at this point. The complementary frame halves of the hangar are constructed and the coverings for the roof half and the side are applied. A pair of complementary halves is transported to the site of assembly and the several clamps 44 are appropriately related and bolted together. By exerting proper pull on the skids 30, the hangar is movable to points of use. When in place, the skids are suitably secured to the supporting surface by means of the pins 34 and the hangar is ready to receive an air craft 12. The sides of the hangar provide protection and shade for the forward portion of the fuselage, the roof shielding such portion and the pilot's compartment from above for maintaining these parts of the plane comparatively cool and comfortable and shielding the instruments and other items and the compartment against the adverse effects of overheating as well as other adverse environmental conditions.

There has thus been provided a hangar for individual aircraft which is effective in its protective aspects in minimizing damage by hot sun and the elements. Additionally, the hangar is of stable construction with a pleasing appearance, is readily portable and is easy to manufacture to provide partially assembled parts adapted to nest for savings in storage and shipping costs, assembly of which can be readily completed in a facile and rapid manner using common tools.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A portable hangar for arcraft comprising a statically stable frame having forwardly slanting sides interconnected by a roof supporting portion extending rearwardly beyond and in overhanging relation to the slanted sides, and a protective skin covering the sides and roof supporting portion and in which the frame is of relatively lightweight tubular construction, and each frame side is generally planar and constituted by a pair of upstanding tubular posts secured at their lower ends to a generally horizontal connector, said tubular posts being inclined forwardly, the connector and the tubular posts being so dimensioned and the latter so inclined that the frame side has a center of weight located at a position intermediate the tubular posts.

2. The hangar of claim 1 in which the roof supporting portion includes transversely disposed tubular members connected to the tubular posts and extending inwardly and upwardly from the frame sides, and longitudinally disposed tubular members connected to the posts and the transversely disposed tubular members at the junctions thereof and extending rearwardly, the rear ends of the longitudinally disposed tubular members being transversely interconnected.

3. The hangar of claim 2 in which the roof supporting portion is constructed in complementary halves joinable along a median between the frame sides.

4. A portable hangar comprising a pair of substantially parallel skids having corresponding predetermined forward and rearward ends; a forward spar mounted on the forward end portion of each skid and upwardly and forwardly extended therefrom; a rearward spar mounted on the rearward end portion of each skid and upwardly and forwardly extended therefrom to a position vertically aligned with a point on its respective skid rearwardly adjacent to the mid-portion thereof and thence substantially vertically upwardly; an elongated stringer individual to each pair of spars having a mid-portion connected to the upper end of its rearward spar and rigidly interconnecting the upper ends of its respective spars, the stringers having forward and rearward ends substantially equally and oppositely extended from their respective rearward spars; and a roof structure rigidly interconnecting the stringers in substantially parallel spaced relation, said roof structure being elongated longitudinally of the skids and having a mid-portion adjacent to the upper ends of the rearward spars whereby the hangar has a center of balance rearwardly adjacent to the mid-portion of the skids.

5. The portable hangar of claim 4 including means for anchoring the skids to a parking area.

References Cited

UNITED STATES PATENTS

| | | | |
|---|---|---|---|
| 2,666,507 | 1/1954 | Ruark | 52—86 X |
| 2,903,752 | 9/1959 | Volk | 52—73 |
| 3,023,463 | 3/1962 | Bigelow | 52—143 |
| 3,242,620 | 3/1966 | Kaiser | 52—73 |
| 3,261,134 | 7/1966 | Crist | 52—73 |
| 2,136,987 | 11/1938 | Walker | 52—90 |
| 2,611,454 | 9/1952 | Arehart | 52—90 |
| 2,904,139 | 9/1959 | Prudhow | 52—90 |
| 3,389,514 | 6/1968 | Horvath | 52—90 |

OTHER REFERENCES

German printed application to Deutz, DAS, 1,135,153, published Aug. 23, 1962, 52–73.

JOHN E. MURTAGH, Primary Examiner

U.S. Cl. X.R.

52—90, -143